April 15, 1930.  E. G. COVELL  1,754,501
FOLDING SEAT
Filed Aug. 3, 1927    2 Sheets-Sheet 1
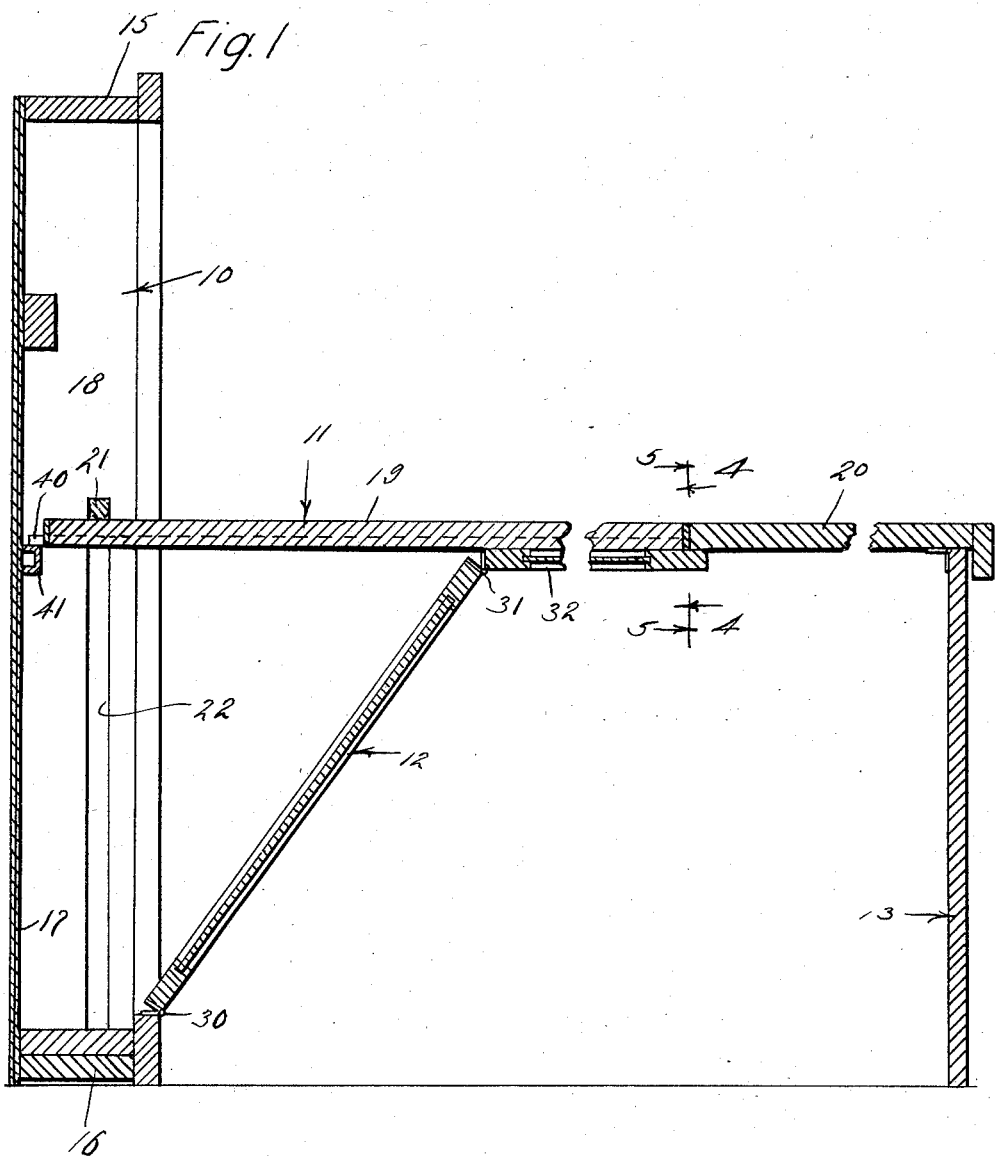
Inventor
Ernest G. Covell
by
his Attorney April 15, 1930. E. G. COVELL 1,754,501
FOLDING SEAT
Filed Aug. 3, 1927 2 Sheets-Sheet 2
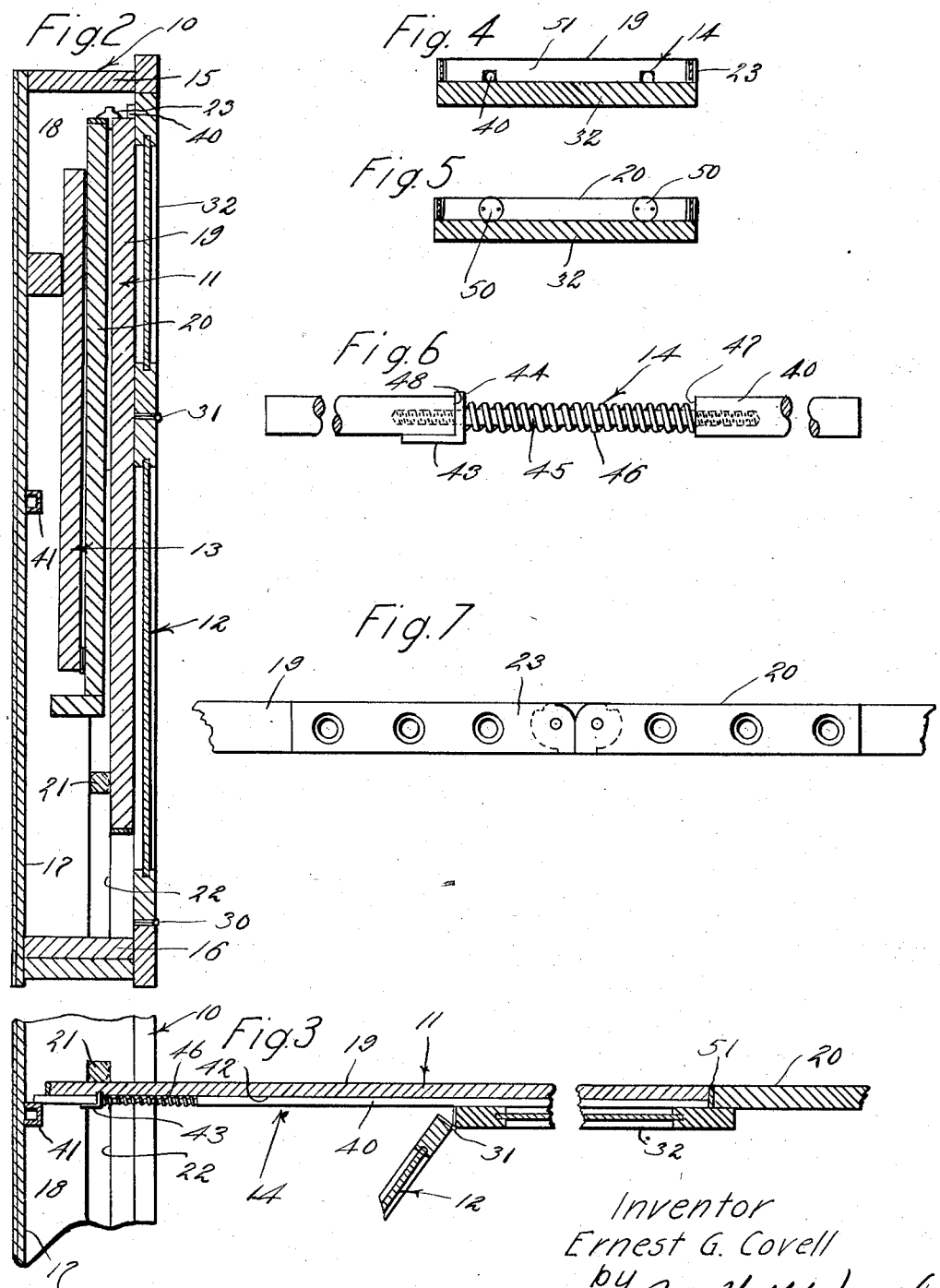
Inventor
Ernest G. Covell
by
his Attorney Patented Apr. 15, 1930

1,754,501

UNITED STATES PATENT OFFICE

ERNEST G. COVELL, OF LOS ANGELES, CALIFORNIA, ASSIGNOR TO CAMEO REFRIGERATOR CORPORATION, OF LOS ANGELES, CALIFORNIA

FOLDING SEAT

Application filed August 3, 1927. Serial No. 210,266.

This invention has to do with a folding seat, or the like, and it is a general object of the invention to provide an effective improved construction suitable for application to or embodiment in furniture, for instance, built-in cabinets, and the like.

Built-in furniture or fixtures in the nature of tables, seats, etc. are being used extensively in dwellings, particularly where it is desired to economize in space. In the type of fixtures referred to, tables, seats, etc. are constructed in units to be applied to or built in a wall, the tables and seats being normally folded in to be flush with the wall and being arranged for extension to operating position when desired for use.

For purpose of example, I will refer to the present invention as applied to a seat in a cabinet or built-in unit, it being understood that the principles of the invention may be applied to other similar devices without departing from the spirit of the invention.

It is a primary object of this invention to provide a folding seat of the character mentioned which is convenient to operate and which is strong and dependable when in use.

Another object of this invention is to provide a folding seat embodying locking means automatically engaged upon the seat being moved to operating position.

A further object of the invention is the provision of a folding seat which, when folded, occupies but little space and is in a form suitable for incorporation in a door or closure.

A further object of this invention is to provide an improved practical locking means for a folding seat of the character mentioned.

The various objects and features of my invention will be best and more fully understood from the following detailed description of a typical form and application of the invention throughout which description reference is had to the accompanying drawings, in which Fig. 1 is a sectional view of a construction embodying my invention showing the seat extended or in operating position. Fig. 2 is a sectional view of the construction showing the seat in the folded position. Fig. 3 is a sectional view illustrating the locking means provided in connection with the seat. Fig. 4 is a transverse sectional view taken as indicated at line 4—4 on Fig. 1. Fig. 5 is a transverse sectional view taken as indicated by line 5—5 on Fig. 1, Fig. 6 is a detailed view illustrating the locking rod assembly detached from the other parts of the device, and Fig. 7 is a side elevation of the hinge construction embodied in the device.

The construction provided by my invention includes, generally, a frame 10, a seat 11, a brace 12 for the seat, a leg 13 for supporting the outer end of the seat and locking means 14 for securing the seat in operating position.

The frame 10 may vary in details of construction, depending upon the manner in which the invention is to be used, for instance, the frame 10 carrying various parts embodying this invention may, of itself, be pivotally mounted to act as a door or closure for a cabinet, or the like, or it may be in the form of a unit suitable for embodiment in a wall, or the like. For purpose of example, I have shown the frame 10 in a form suitable for embodiment in a wall. In the drawings I have shown the frame as including, a top 15, a bottom 16, a back 17 and sides 18. The various parts of the frame are assembled or secured together to form a box-like structure and are proportioned to properly accommodate the other parts as will be hereinafter described.

The seat 11 comprises two sections, an inner section 19, and an outer section 20. The inner section 19 has its inner end slidable pivotally connected to the frame through a transversely disposed connecting member 21 which is secured to the section so that its ends project into vertical guideways 22 provided in the sides 18 of the frame. The outer section 20 of the seat is pivotally connected to the outer end of the inner section 19 so that it is movable between an extended position where the sections are end to end as shown in Fig. 1 and a folded position where the section 20 is over the section 19 as shown in Fig. 2. In the drawings I have shown the sections pivotally connected by means of hinges 23. The hinges preferred for use in connecting the sections of the seat are of the construction set forth and claimed in my copending application entitled "Hinge" filed on even date herewith.

The leg 13 provided for supporting the outer end portion of the seat is in the form of a drop leg hinged to the outer end portion of the outer seat section 20 to be movable between an operating position such as shown in Fig. 1 and a folded position where it is against the underside of the section 20 as shown in Fig. 2. The leg drops automatically as the seat is opened and folds in automatically as the seat is closed or folded.

The brace 12 connects the seat with the frame and in the preferred arrangement has its lower end pivotally connected to the bottom 16 of the frame and has its outer or upper end pivotally connected to the inner section 19 of the seat at a point intermediate the ends of the section. In the drawings I have shown the brace connected to the bottom 16 through hinges 30 and to section 19 through hinges 31. The brace 12 is preferably in the form of a panel proportioned to fit the open front of the frame 10. In the construction shown in the drawings a panel part 32 is provided on the underside of the outer end portion of the inner seat section 19. The hinge 31 connects the top end of the brace 12 with the panel part 32 so that the panel part forms a continuation of the brace when the device is folded as shown in Fig. 2; the brace 12 and panel part 32 together forming a complete closure for the front of the frame 10.

The locking means 14 provided for securing the seat in operating position includes one or more locking rods 40 carried by the inner seat section 19 to be operated by the outer seat section 20 to cooperate with a keeper 41 carried by the frame 10. Each rod 40 is arranged in a longitudinal groove 42 provided in the underside of the seat section 19 and is somewhat longer than the seat section as shown throughout the drawings. The rod 40 is retained in the groove 42 by the panel part 32 and by a bracket 43 applied to the underside of the seat section 19. The bracket 43 has a flange 44 provided with an opening to slidably pass a reduced part 45 of the rod 40. A spring 46 is carried on the reduced part 45 between the flange 44 and a shoulder 47 formed on the rod by the provision of the reduced part. The spring normally urges the rod toward the outer end of the seat section so that its outer end normally projects from the end of the seat section. A second shoulder 48 formed on the rod by the provision of the reduced part limits the amount the rod projects from the outer end of section 19 through the action of the spring. When the outer section 20 of the seat is moved to operating position as shown in Fig. 1, its inner end engages the outer end of the locking rod, or rods, as the case may be, causing the rod to be moved inwardly so that its inner end projects from the inner end of the seat section 19 to engage over the keeper 41. The keeper 41 is preferably a metal part, for instance, a channel iron arranged transversely at the back 17 of the frame. In the preferred construction the ends of the keeper may be supported in notches provided in the sides 18 of the frame. In the preferred construction metal bearing plates 50 are provided at the inner end of the outer seat section 20 to engage the outer ends of the locking rods. Further, in practice, I prefer to provide a metal guide plate 51 at the inner end of the inner seat section to form a guide and bearing for the locking rod adjacent the keeper 41. In the preferred construction of the locking rod, it is formed in sections screwthreaded together as shown in Fig. 6 of the drawings, allowing the bracket and spring to be assembled on the reduced part of the rod in the manner shown in the drawings.

From the foregoing description it is believed that the operation and the advantages of my invention will be apparent. When the construction is not in use the parts are in the position as shown in Fig. 2 in which the brace 12 and panel part 32 form a sightly front or closure for the frame 10. When the device is desired for use the upper end of the inner seat sction 19 is swung forward and down to the position shown in Fig. 1, during which operation the brace 12 swings forward to the inclined position shown in Fig. 1, while the member 21 connecting the inner end of the seat section 19 with the frame moves upwardly in the guideways 22. When the seat section 19 reaches the horizontal position, the member 21 is in engagement with the upper ends of the guideways. The outer seat section is then swung out to the extended position as shown in Fig. 1, during which operation the leg 13 automatically drops to operating position where it supports the outer end of the seat. Further, during movement of the outer section to the extended position, the locking rods are moved inwardly as hereinabove described so that their inner ends engage over the keeper 41 and thus lock the seat section 19 in operating position. It will be obvious that the seat section 19 can not be moved from the horizontal position until such time as the outer seat section has been returned to its folded position, allowing the locking rods to be retracted by the action of the springs. It will be obvious that the construction can be easily returned or folded to the position shown in Fig. 2 when it is no longer desired for use. During the return of the seat to the folded position the drop leg automatically returns to folded position against the outer seat section.

Having described only a typical preferred form of my invention I do not wish to limit myself to the specific details set forth, but wish to reserve to myself any changes or variations that may appear to those skilled in the art or that may fall within the scope of the following claims.

Having described my invention, I claim:

1. In combination a frame, a seat including two pivotally connected sections, means connecting the inner end of the seat and the frame for relative movement, and means whereby the seat is set against movement relative to the frame when the seat sections are in operating position, said last mentioned means including a locking member actuated by the outer seat section.

2. In combination a frame, a seat including an inner section slidably pivotally connected with the frame and an outer section pivotally connected with the outer end of the inner section, and a member carried by the inner section for locking the section against movement relative to the frame, said member being normally unactuated and having a part cooperating with the outer section whereby the member is actuated.

3. In combination a frame, a seat including an inner section slidably pivotally connected with the frame and an outer section pivotally connected with the outer end of the inner section, a member carried by the inner section for locking the section against movement relative to the frame, and a spring normally holding the member unactuated and with one end in position to be engaged and operated by the outer seat section upon its movement to operating position.

4. In combination a frame, a seat including an inner section slidably pivotally connected with the frame and an outer section pivotally connected with the outer end of the inner section, a keeper carried by the frame, and a locking rod carried by the inner section to be operated into cooperating engagement with the keeper by the outer section.

5. In combination a frame, a seat including two pivotally connected sections, means slidably pivotally connecting the inner section with the frame, a brace for the inner section when in operating position, said brace being pivotally connected to the outer part of the section and to the lower part of the frame, and means actuated by the outer section for positively setting the inner section in operating position when the outer section is in operating position.

6. A locking device for a folding support including a rod having a reduced portion intermediate its ends, a bracket with a part slidably passing the reduced portion of the rod to be held on the rod by the portions of the rod adjacent the reduced portion, and a spring on the reduced portion between said part and one of the portions of the rod adjacent the reduced portion.

In witness that I claim the foregoing I have hereunto subscribed my name this 1st day of July, 1927.

ERNEST G. COVELL.